United States Patent
Ko et al.

(10) Patent No.: US 7,834,775 B2
(45) Date of Patent: Nov. 16, 2010

(54) AUTOMATIC DETECTING DEVICE FOR RADIO FREQUENCY ENVIRONMENT

(75) Inventors: Hsuan-Chung Ko, Hsin-Chu (TW);
Chen-Yang Hsieh, Hsin-Chu (TW)

(73) Assignee: King Juan Electronics Co., Ltd., Hsin-Chu (TW)

( * ) Notice: Subject to any disclaimer, the term of this patent is extended or adjusted under 35 U.S.C. 154(b) by 301 days.

(21) Appl. No.: 12/109,588

(22) Filed: Apr. 25, 2008

(65) Prior Publication Data

US 2009/0207036 A1  Aug. 20, 2009

(30) Foreign Application Priority Data

Feb. 15, 2008  (TW) ............................... 97105372 A

(51) Int. Cl.
*G08B 21/00* (2006.01)
(52) U.S. Cl. ............... 340/661; 455/67.11; 455/67.13
(58) Field of Classification Search ............... 340/661; 455/63.1, 67.11, 67.13, 226.1
See application file for complete search history.

(56) References Cited

U.S. PATENT DOCUMENTS

| | | | | |
|---|---|---|---|---|
| 3,971,019 A | * | 7/1976 | Rymes | 342/175 |
| 4,204,164 A | * | 5/1980 | Kage | 455/135 |
| 4,249,261 A | * | 2/1981 | Ogita | 455/266 |
| 6,229,997 B1 | * | 5/2001 | Addy | 455/226.1 |
| 6,327,483 B1 | * | 12/2001 | Taniguchi | 455/569.1 |
| 6,957,052 B2 | * | 10/2005 | Kuehn | 455/67.13 |
| 7,158,769 B2 | * | 1/2007 | Okanoue et al. | 455/67.11 |
| 7,164,933 B1 | * | 1/2007 | Steigerwald et al. | 455/562.1 |
| 2002/0073436 A1 | * | 6/2002 | Cowley et al. | 725/131 |

* cited by examiner

*Primary Examiner*—John A Tweel, Jr.
(74) *Attorney, Agent, or Firm*—Thomas, Kayden, Horstemeyer & Risley, LLP

(57) ABSTRACT

The present invention provides an automatic detecting device for radio frequency environment used to detect radio frequency noise. The device uses an antenna to receive radio frequency noise and the radio frequency noise is passing a radio frequency comparator and transformed into a voltage signal. Then, the voltage signal passes through an amplifier and is amplified to be an output voltage. If the output voltage exceeds a threshold voltage, it drives a post stage circuit to warn when the radio frequency noise is beyond a normal value.

20 Claims, 5 Drawing Sheets

US 7,834,775 B2

AUTOMATIC DETECTING DEVICE FOR RADIO FREQUENCY ENVIRONMENT

BACKGROUND OF THE INVENTION

1. Field of the Invention

The present invention generally relates to an automatic detecting device, and more particularly to an automatic detecting device for radio frequency noise.

2. Description of the Prior Art

While testing the element of the radio frequency circuit, the detection of manufacturing environment is required to execute. Because manufacturing environment may be affected by the radio frequency noise and the testing might fail, Pass-bin becomes Fail-bin or Fail-bin becomes Pass-bin. Therefore, before production, the ways of using the radio communication devices and the factors which can affect the testing of high frequency elements may usually be restricted. But general detection of manufacturing environment only performs limited protection, such as the indoor noise from the reflection or scattering of Auto Test Equipment (ATE). General detection of manufacturing environment is not effective to detect radio frequency noise around the element under test, and it is difficult to determine whether the radio frequency noise is excess or not, thereby affecting the result of testing the pin. In other words, the detection method of the manufacturing environment described above could reduce the jamming of radio frequency noise, but cannot detect the influence by the noise around the manufacturing environment.

For the reason above, it is necessary to provide a method for alerting whether the radio frequency noise is excess or not when manufacturing. During testing Load Board or designing Chip Evaluation Board (EVB), the layout for the antenna is added into the Print Circuit Board (PCB). The antenna is implemented with the testing software to detect the frequency bandwidth, which is easy to generate the noise (such as mobile phone chips) or is usually used by the customers. Since the antenna is close enough to the element under test, and the testing environment between the antenna and the element under test is similar, the antenna can almost detect the environment noise while the element is being tested.

SUMMARY OF THE INVENTION

In view of the foregoing omission of the prior art, the present invention provides an automatic detecting device for radio frequency environment and method used to detect radio frequency noise. The detecting result of the element under test is correct while the radio frequency noise is not excess, and the detecting result of the element under test is wrong while the radio frequency noise is excess.

According to the object, the present invention provides an automatic detecting device for radio frequency environment to detect radio frequency noise. The antenna, especially a Planar Inverted F Antenna, is used to receive the radio frequency noise, the post stage circuit, such as a counter, a Light Emitting Diode (LED) or a buzzer, is used to warn when the radio frequency noise is beyond a normal value. The counter is used to count the numbers of times when the radio frequency noise is excess. If the detecting result indicates that the radio frequency noise is excess, the glittering of the Light Emitting Diode (LED) or the sound of the buzzer could be used to warn when the radio frequency noise is beyond a normal value.

According to another object, the present invention provides a method to detect radio frequency noise. First of all, an antenna is used to receive the radio frequency noise, then, a comparator is used to convert the radio frequency noise into voltage signals. After that, the voltage signals are amplified by an amplifier, and then drive the post stage circuit to warn when the radio frequency noise is beyond a normal value.

According to the foregoing objects, the present invention provides an automatic detecting device for radio frequency environment and method to detect radio frequency noise. The automatic detecting device for radio frequency environment receives the radio frequency noise by an antenna, converts the input radio frequency signals into voltage signals by a radio frequency comparator, and amplifies the voltage signals by an amplifier (ex, voltage amplifier). If the voltage exceeds a threshold voltage, a post stage circuit would be driven to warn when the radio frequency noise is beyond a normal value. The automatic detecting device for radio frequency environment includes an antenna to receive the radio frequency noise, a radio frequency comparator to output the voltage signal, an amplifier to drive a post stage circuit by amplifying the very low output voltage, and a post stage circuit, such as a counter, a LED warning light or a buzzer, to warn when the radio frequency noise is beyond a normal value. Furthermore, in order to receive omni radio frequency noise, a motor could be installed to make the antenna or the automatic detecting device for radio frequency environment to rotate clockwise or counterclockwise.

DETAILED DESCRIPTION OF THE INVENTION

The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components.

Based on the operated frequency band 900 MHZ, 1800 MHZ and 2400 MHZ, the antenna, especially Inversed F Antenna (IFA) applied in mobile phones is proper to be used for receiving noise (ex, radio frequency noise) in the present invention. There are three basic types in IFA: 1. Conventional wire element IFA, 2. Planar IFA, and 3. Integrated IFA. Regarding the planar IFA, a big plane is used to substitute the conventional transmission line, so the disadvantage of narrow bandwidth of Conventional wire element IFA is improved. Moreover, the integrated IFA is capable of wide bandwidth, but the antenna directivity character is poor. The antenna pattern of PIFA is better because it is less affected by the ground effect. In short, the PIFA is the best to receive radio frequency noise because its wide bandwidth and better radio frequency receiving character. On the contrary, the conventional wire element IFA and the integrated IFA can also be used to receive radio frequency noise in the present invention. It is not limited in this specification.

Figure 1:
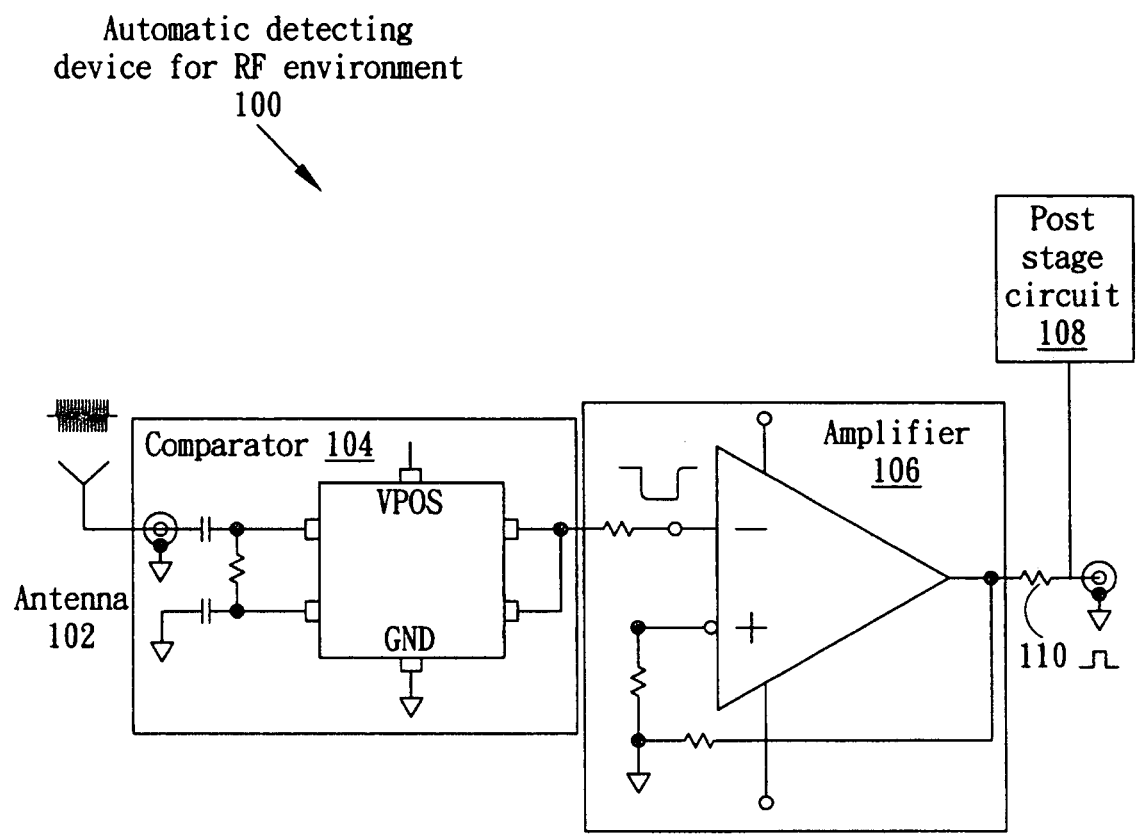
FIG. 1 shows an automatic detecting device for radio frequency environment according to an embodiment of the present invention.

FIG. 1 shows an automatic detecting device for radio frequency environment according to an embodiment of the present invention. As shown in FIG. 1, the automatic detecting device for radio frequency environment 100 includes an antenna 102, a comparator 104, an amplifier 106 (ex, voltage amplifier) and a post stage circuit 108. The antenna 102 is connected to the comparator 104, the comparator 104 is connected to the amplifier 106, and the amplifier 106 is connected to the post stage circuit 108. The post stage circuit 108 includes a counter, a LED or a buzzer. The counter is used to count the numbers of times when the radio frequency noise is excess, and the Light Emitting Diode (LED) will glitters or the buzzer will sound when the radio frequency noise is beyond a normal value. After receiving noise (such as radio frequency noise) by the antenna 102, the comparator 104 with multi-level output will process the received radio frequency noise, convert it to DC level and output. The comparator 104 is able to output different DC voltages according to the intensity of the received radio frequency signals. It is useful to detect the intensity of the radio frequency signals. Users distinguish whether the radio frequency noise is beyond a normal value by the output of the DC level. The output pins of the comparator 104 are connected to the amplifier 106 which amplifies the output voltage. When the output voltage is beyond a normal value, the amplifier 106 drives the post stage circuit 108 to warn when radio frequency noise is excess. Based on the environment condition or designer's need, the post stage circuit 108, such as a counter, a LED or a buzzer, is able to detect the intensity of radio frequency signals and analyze it. Different post stage circuits 108 (such as a counter, a LED or a buzzer) need different drive voltages. Therefore, a resistor 110 is added in the output of the amplifier 106, and different post stage circuit 108 can be driven by selecting the resistance of the resistor 110.

Figure 2:
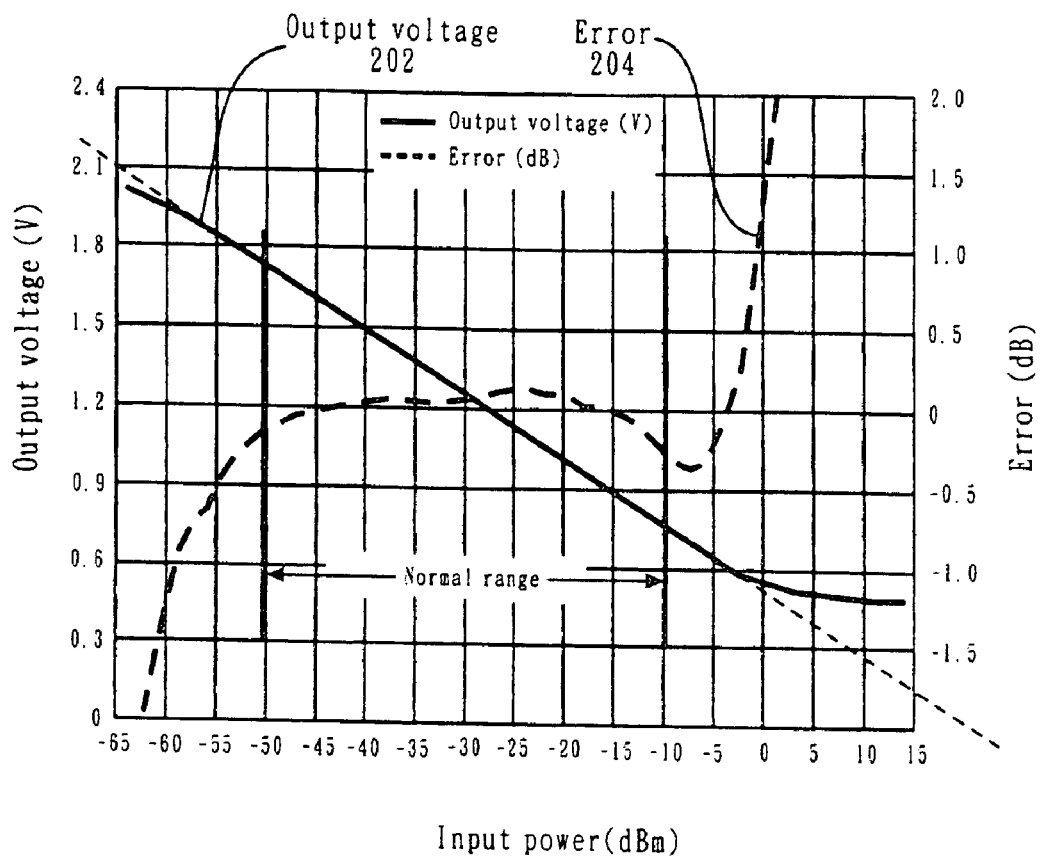
FIG. 2 is a view illustrating a relationship between input radio frequency signals and output voltages of the radio frequency comparator of the present invention.

FIG. 2 illustrates a relationship between input radio frequency signals and output voltages of the radio frequency comparator with multi-level output of the present invention. In FIG. 2, AP8313 comparator manufactured by Analog Device Inc. is used as the comparator 104, and test data herein is also from Analog Device Inc. The comparator 104 demodulates the radio frequency signal, converts it to DC level and outputs. In other words, the function of the comparator 104 is to convert the radio frequency signal to the voltage signal. The antenna 102 for receiving radio frequency signals is connected to the input of the comparator 104. The amplifier 106 for amplifying voltage signals to drive the post stage circuit 108 is connected to the output of the comparator 104. As shown in FIG. 2, at normal temperature 25° C., the modulus of the output voltage of comparator 104 is approximately larger than 0.6 volt, but approximately smaller than 1.7 volt. While the output voltage 202 converted from radio frequency noise exceeds that range, the error 204 would be 2 or −1.5 decibel substantially. It is showing that the radio frequency noise is beyond a normal value while the modulus of output voltage 202 is higher than 1.7 volt, and the post stage circuit would be driven to warn by the amplifier 106. Because the output voltage 202 from the comparator 104 is not large enough, it is necessary to add the amplifier 106 to drive the post stage circuit 108. The output voltage of the comparator 104 is negative, therefore the amplifier 106 is usually an inverse amplifier to convert into positive voltage to drive the post stage circuit 108.

Figure 3:
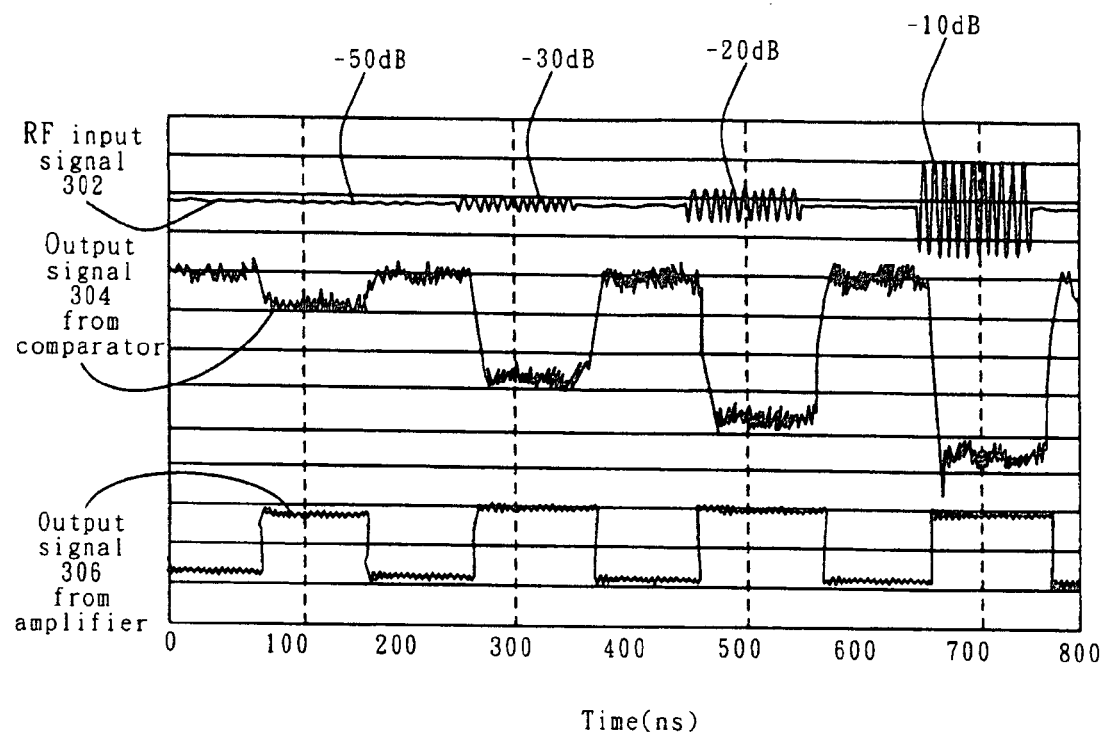
FIG. 3 is a view illustrating a radio frequency input signals, output signals of the radio frequency comparator and output signals of the amplifier according to an embodiment of the present invention.

FIG. 3 is a graph which illustrates frequency comparator and output signals of the amplifier according to FIG. 1. AP8313 comparator manufactured by Analog Device Inc. is used as the comparator 104, and test data herein is also from Analog Device Inc. The radio frequency input signal 302 represents power, and decibel (dB) is its unit. As the radio frequency input increases, the output from the comparator 104 (ex, radio frequency comparator) also increases. The voltage of the output signal 304 from the comparator 104 is negative and almost steady. After being processed by the inverse amplifier 106, an output signal 306 which is positive square wave voltage would be transmitted from the amplifier 106 to drive the post stage circuit 108. As shown in FIG. 3, the radio frequency signal varies with time and environment. As the radio frequency signal is too weak, the output voltage from the amplifier 106 is not large enough to drive the post stage circuit 108, such as a counter, a LED or a buzzer, and that means the radio frequency noise around the test environment is not beyond a normal value to make the pin test fail. On the contrary, while the radio frequency signal is large, the output voltage from the amplifier 106 would drive the post stage circuit 108 to warn when the radio frequency noise is beyond a normal value. Also shown in FIG. 3, the function of the comparator 104 is to convert the received radio frequency noise into a voltage signal and transmit this voltage signal to the inverse amplifier 106 to drive the post stage circuit 108. Besides, the output voltage of the comparator 104 is negative, and is increased as the radio frequency input signal 302 increases. The output voltage of the comparator 104 is proportional to the radio frequency input signal 302. The output signal 306 is positive because it is processed by the inverse amplifier 106. In the embodiments shown in FIG. 2 & 3, AP8313 comparator manufactured by Analog Device Inc. is utilized. It is noted that comparator with similar function could be used and not limited.

Figure 4A:
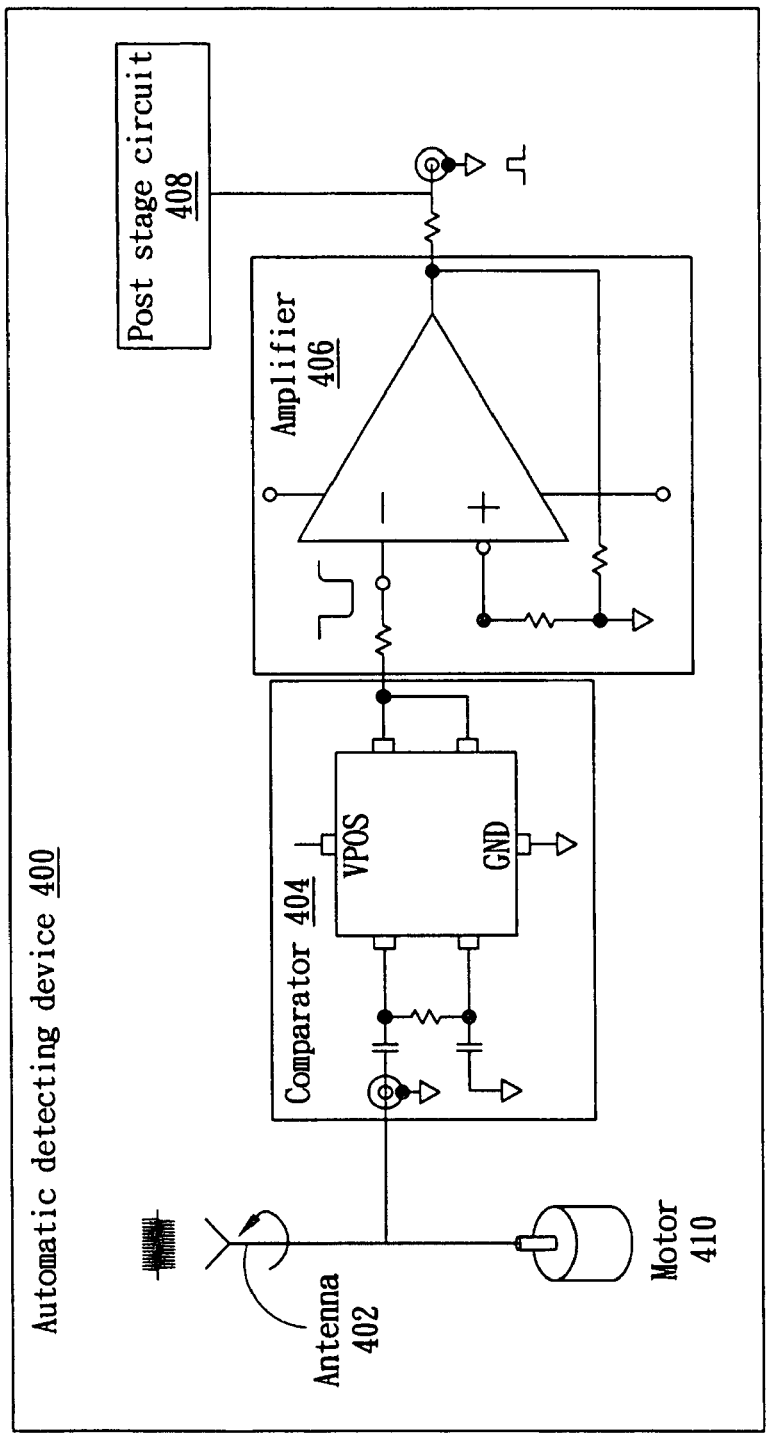
FIG. 4A shows an automatic detecting device with a rotating antenna driven by a motor for radio frequency environment according to an embodiment of the present invention.

FIG. 4A shows an automatic detecting device with a rotating antenna driven by a motor for radio frequency environment according to an embodiment of the present invention. The automatic detecting device for radio frequency environment 400 includes an antenna 402, a comparator 404 (ex, radio frequency comparator), an amplifier 406, a post stage circuit 408 and a motor 410. As shown, the antenna 402 is connected to the comparator 404, the comparator 404 is connected to the amplifier 406, and the amplifier 406 is connected to the post stage circuit 408. The post stage circuit 408 includes a counter, a LED or a buzzer. In order to broaden receiving range and not be limited by a single direction while the antenna 402 receives radio frequency noise, a motor 410 is installed and drives the antenna 402 to rotate, and the radio frequency noise would be detected more easily and accurately. In such way, the sensitivity and the accuracy of the present detecting device would be improved.

Figure 4B:
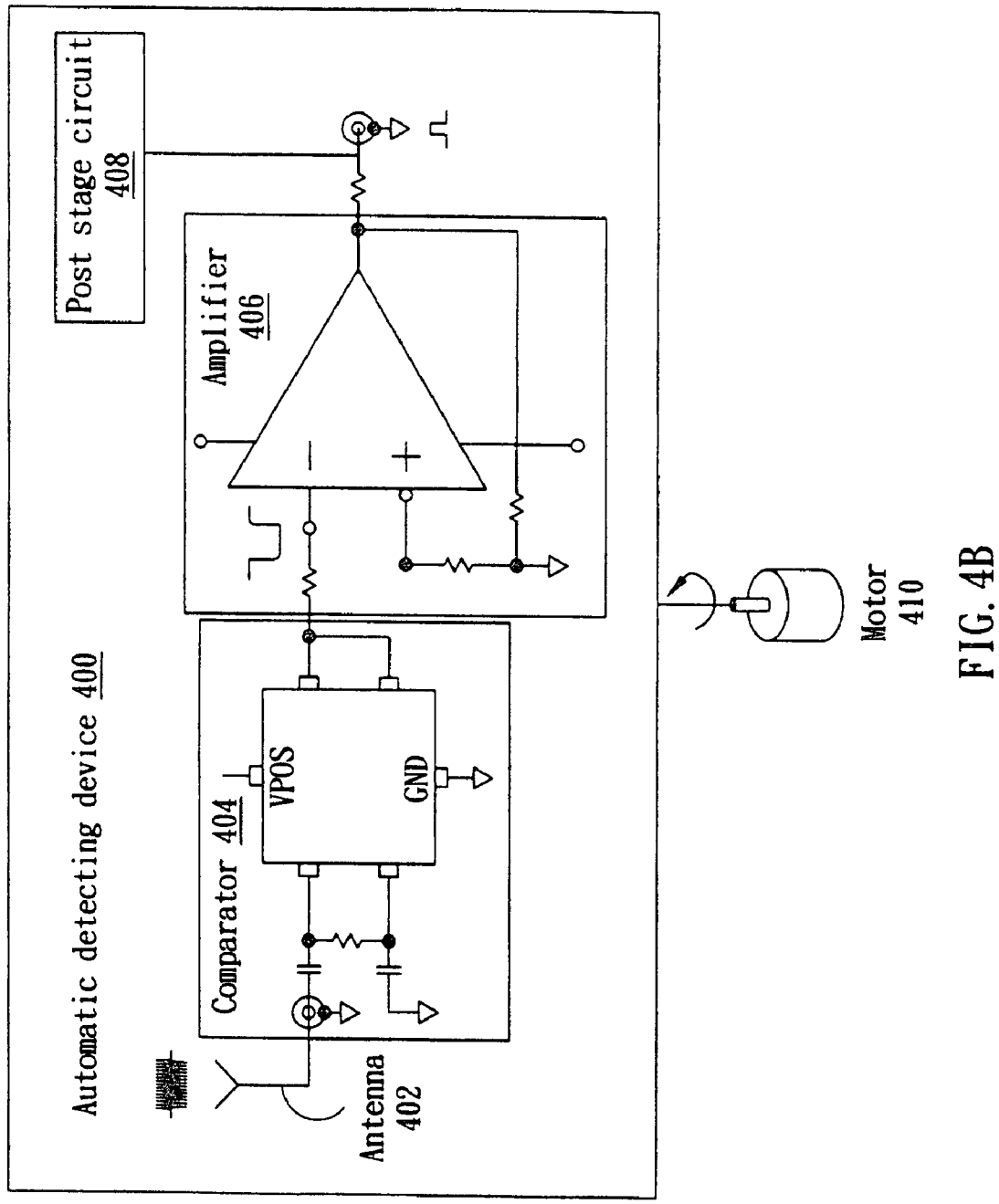
FIG. 4B shows a rotating automatic detecting device driven by a motor for radio frequency environment according to another embodiment of the present invention.

FIG. 4B shows a rotating automatic detecting device driven by a motor for radio frequency environment according to another embodiment of the present invention. As shown, an antenna 402 is connected to a comparator 404, the comparator 404 is connected to an amplifier 406, and the amplifier 406 is connected to a post stage circuit 408. The post stage circuit 408 includes a counter, a LED or a buzzer. However, the whole detecting device is mounted on a motor 410 and rotated by motor 410. In such way, the antenna is not fixed but shifting, and the radio frequency noise would be detected more easily to reduce the pin test error.

Although specific embodiments have been illustrated and described, it will be appreciated by those skilled in the art that various modifications may be made without departing from the scope of the present invention, which is intended to be limited solely by the appended claims.

What is claimed is:

1. A automatic detecting device for radio frequency noise, comprising:
   an antenna for receiving said radio frequency noise;
   a comparator electrically connected to said antenna, and used for receiving and comparing said radio frequency noise from said antenna and outputting a voltage signal;
   an amplifier electrically connected to said comparator, and used for amplifying said voltage signal from said comparator;
   a post stage circuit electrically connected to said amplifier, and used for receiving said voltage signal to warn when said radio frequency noise is beyond a normal value.

2. The automatic detecting device for radio frequency noise according to claim 1, wherein said comparator is connected to a supply voltage Vcc and a ground voltage (Ground, GND), and said comparator converts said radio frequency noise into said voltage signal and transmits to said amplifier.

3. The automatic detecting device for radio frequency noise according to claim 1, further comprising a motor, wherein said motor is connected to said antenna and rotates said antenna to broaden receiving direction of said antenna.

4. The automatic detecting device for radio frequency noise according to claim 1, further comprising a motor, wherein said motor is connected to said automatic detecting device and rotates said automatic detecting device to broaden receiving direction of said antenna.

5. The automatic detecting device for radio frequency noise according to claim 1, wherein said post stage circuit is selected from the group consisting of a counter, a light emitting diode (LED) and a buzzer.

6. The automatic detecting device for radio frequency noise according to claim 1, wherein said antenna is an F antenna.

7. The automatic detecting device for radio frequency noise according to claim 6, wherein said F antenna is selected from the group consisting of a conventional wire element IFA (Inverse F Antenna), a planar IFA and an integrated IFA.

8. The automatic detecting device for radio frequency noise according to claim 1, wherein said comparator is a radio frequency comparator.

9. The automatic detecting device for radio frequency noise according to claim 1, wherein said amplifier is a voltage amplifier.

10. The automatic detecting device for radio frequency noise according to claim 1, wherein said amplifier is an inverse amplifier.

11. The automatic detecting device for radio frequency noise according to claim 1, further comprising a resistor, wherein the output voltage from said amplifier is controlled by selecting resistance of said resistor to drive said post stage circuit.

12. An automatic detecting device for frequency jamming environment, comprising:
   an antenna for receiving a plurality of radio frequency noise signals;
   a radio frequency comparator connected to said antenna, and used for comparing said plurality of radio frequency noise signals and outputting a voltage signal;
   a voltage amplifier connected to said radio frequency comparator, and used for amplifying said very low voltage signal from said radio frequency comparator;
   a post stage circuit connected to said voltage amplifier, and used for receiving said voltage signal to warn when said radio frequency noise is beyond a normal value.

13. The automatic detecting device for frequency jamming environment according to claim 12, wherein said antenna is an F antenna.

14. The automatic detecting device for frequency jamming environment according to claim 12, wherein said F antenna is selected from the group consisting of a conventional wire element IFA, a planar IFA and an integrated IFA.

15. The automatic detecting device for frequency jamming environment according to claim 12, wherein said radio frequency comparator is connected to a supply voltage Vcc and a ground voltage (Ground, GND), and said radio frequency comparator converts said radio frequency noise into said voltage signal and transmits to said voltage amplifier.

16. The automatic detecting device for frequency jamming environment according to claim 12, wherein said post stage circuit is selected from the group consisting of a counter, a LED and a buzzer.

17. The automatic detecting device for frequency jamming environment according to claim 12, further comprising a motor, wherein said motor is connected to said antenna and rotates said antenna to broaden receiving direction of said antenna.

18. The automatic detecting device for frequency jamming environment according to claim 12, further comprising a motor, wherein said motor is connected to said automatic detecting device and rotates said automatic detecting device to broaden receiving direction of said antenna.

19. The automatic detecting device for frequency jamming environment according to claim 12, wherein said voltage amplifier is an inverse voltage amplifier.

20. The automatic detecting device for frequency jamming environment according to claim 12, further comprising a resistor, wherein the output voltage from said voltage amplifier is controlled by selecting resistance of said resistor to drive said post stage circuit.

* * * * *